(12) United States Patent
Zhou

(10) Patent No.: US 8,901,430 B2
(45) Date of Patent: Dec. 2, 2014

(54) CABLE TERMINATION FOR HIGH-VOLTAGE CABLE APPLICATION

(75) Inventor: Mingyang Zhou, Shanghai (CN)

(73) Assignee: G&W Electric Company, Bolingbrook, IL (US)

( * ) Notice: Subject to any disclaimer, the term of this patent is extended or adjusted under 35 U.S.C. 154(b) by 551 days.

(21) Appl. No.: 12/672,440

(22) PCT Filed: Aug. 8, 2007

(86) PCT No.: PCT/US2007/075486
§ 371 (c)(1),
(2), (4) Date: May 11, 2010

(87) PCT Pub. No.: WO2009/020461
PCT Pub. Date: Feb. 12, 2009

(65) Prior Publication Data
US 2011/0180322 A1    Jul. 28, 2011

(51) Int. Cl.
| | | |
|---|---|---|
| H01B 17/58 | (2006.01) |
| H02G 15/064 | (2006.01) |
| H01B 17/26 | (2006.01) |
| H01B 17/00 | (2006.01) |
| H01B 17/44 | (2006.01) |
| H02G 15/02 | (2006.01) |
| H02G 15/08 | (2006.01) |
| H05K 5/00 | (2006.01) |

(52) U.S. Cl.
CPC .................................. *H02G 15/064* (2013.01)
USPC ..... 174/167; 174/142; 174/148; 174/140 CR; 174/80; 174/18

(58) Field of Classification Search
CPC ........ H01B 17/00; H01B 17/28; H01B 17/34; H02G 15/22
USPC ........... 174/142, 137 R, 140 R, 140 CR, 145, 174/73.1, 80, 81, 74 R, 14 R, 14 CR, 102 SC, 174/106 SC, 110 SC, 11 S, 73 SC, 128.1, 174/128.2, 128 F, 152 G, 152 R, 153 G, 209, 174/75 R, 75 D, 135, 144, 141 R, 140 H, 174/11 BH, 12 BH, 19, 127, 14 BH, 143, 174/650, 18, 77 R, 76, DIG. 8, 31 R, 14 C, 174/105 SC See application file for complete search history.

(56) References Cited

U.S. PATENT DOCUMENTS 1,774,969 A * 9/1930 Grant ............................ 361/271
2,386,185 A    10/1945 Beaver et al.

(Continued)

FOREIGN PATENT DOCUMENTS

| CN | 1868007 | 11/2006 |
|---|---|---|
| CN | 2849917 | 12/2006 |

(Continued)

OTHER PUBLICATIONS

Office Action received in Mexican Patent Application No. MX/a/2010/001165, dated Jun. 23, 2011 (with English translation of relevant sections.).

(Continued)

*Primary Examiner* — Hoa C Nguyen
*Assistant Examiner* — Binh Tran
(74) *Attorney, Agent, or Firm* — Michael Best & Friedrich LLP

(57) ABSTRACT

A cable termination includes a tubular body having an outer surface and a through aperture, and at least one shed extending from the outer surface. The shed includes an outer edge. A first support is coupled to the shed, extends between the outer surface of the tubular body and the outer edge of the shed, and is configured to increase the rigidity of the shed.

21 Claims, 4 Drawing Sheets

(56) References Cited

U.S. PATENT DOCUMENTS

| | | | |
|---|---|---|---|
| 2,748,184 A | | 5/1956 | Nicholas |
| 2,835,725 A | | 5/1958 | Nicholas |
| 3,033,915 A | * | 5/1962 | Huston ................. 174/73.1 |
| 3,796,821 A | | 3/1974 | Lusk |
| 3,808,352 A | | 4/1974 | Johnson |
| 4,053,707 A | * | 10/1977 | Ely et al. ................. 174/209 |
| 4,349,855 A | * | 9/1982 | Nagai ................. 361/127 |
| 4,555,588 A | * | 11/1985 | DuPont ................. 174/73.1 |
| 4,670,625 A | | 6/1987 | Wood et al. |
| 5,280,136 A | | 1/1994 | Yaworski et al. |
| 5,466,891 A | | 11/1995 | Freeman et al. |
| 5,648,641 A | * | 7/1997 | Guthrie ................. 174/139 |
| 5,736,208 A | | 4/1998 | Wilck et al. |
| 6,265,663 B1 | * | 7/2001 | Cicogna et al. ............. 174/73.1 |
| 6,333,462 B1 | | 12/2001 | Quaggia |
| 7,964,268 B2 | * | 6/2011 | Waters et al. ................. 428/174 |

FOREIGN PATENT DOCUMENTS

| | | | |
|---|---|---|---|
| DE | 2746295 | | 4/1979 |
| DE | 3426001 A1 | * | 2/1985 |
| EP | 1209701 | | 5/2002 |
| FR | 2461384 | | 1/1981 |
| FR | 2547452 A1 | * | 12/1984 |
| GB | 2065386 A | * | 6/1981 |
| GB | 2200502 | | 8/1988 |
| JP | 05198228 A | * | 8/1993 |
| JP | 9251816 | | 9/1997 |
| JP | 11312426 | | 11/1999 |
| WO | 2007133202 | | 11/2007 |

OTHER PUBLICATIONS

Official Action received in Russian Patent Application No. 2010108284, dated Jun. 20, 2011 (with English translation).
Office Action from the Canadian Intellectual Property Office for Application No. 2694813 dated Mar. 8, 2012 (2 pages).
Second Office Action from the State Intellectual Property Office of the People's Republic of China for Application No. 200680054557.7 dated Jan. 31, 2012 (Translation and Original, 10 pages).
First Office Action from the State Intellectual Property Office of the People's Republic of China for Application No. 200680054557.7 dated Dec. 21, 2010 (Translation, 3 pages).
Extended Search Report from the European Patent Office for Application No. 06759639.5 dated Jul. 6, 2011 (9 pages).
Office Action from the Russian Patent Office for Application No. 2008148844-09 dated Oct. 15, 2009 (Translation and Original, 5 pages).
PCT/US06/18367 International Search Report and Written Opinion dated Jan. 24, 2007 (5 pages).
G&W Electric Co. "Capnut Terminations", Catalog Section 5, pp. 2-23 (available prior to Aug. 2007).
G&W Electric Co. "Dry Type Outdoor Termination—for XLPE Extruded Cable" (Feb. 2006).
G&W Electric Co. "Easy-On II Terminations" website pages printed from www.gwelec.com (available prior to Aug. 2007).
G&W Electric Co. "G&W Application Guide—Subject: Underground Transmission Turnkey Project" (Aug. 2006).
G&W Electric Co. "G&W 115-161kV GIS Terminations" Catalog Supplements (Mar. 1994, Feb. 1996, and Aug. 1999).
G&W Electric Co. "PSC Terminations" website pages printed from www.gwelec.com (available prior to Aug. 2007).
G&W Electric Co. "Slip-On Terminators", Catalog Section 3, pp. 2-10 (available prior to Aug. 2007).
G&W Electric Co. "Spring-loaded Elastomer Stress Control Terminations" website pages printed from www.gwelec.com (available prior to Aug. 2007).
G&W Electric Co. "Sodertite Terminations", Catalog Section 6, pp. 2-11 (available prior to Aug. 2007).
G&W Electric Co. "Transmission Voltage Cable Terminations and Joints 2004 Edition" (Aug. 2003).
International Search Report and Written Opinion, PCT/US07/75486 (Aug. 6, 2008).
Siconex SWCC SHOWA Cable Systems Co., Ltd. Cable Accessory Products brochure (Jul. 2006).
Office Action received in Chinese Patent Application No. 200780100198.9, dated Sep. 21, 2011 (English translation).
Office Action from the State Intellectual Property Office of the People's Republic of China for Application No. 200780100198.9 dated Jul. 4, 2012 (English Translation Only, 3 pages).
Third Office Action from the State Intellectual Property Office of China for Application No. 200780100198.9 dated Feb. 5, 2013 (English Translation—8 pages).
Third Office Action from the State Intellectual Property Office of China for Application No. 2006800545577 dated Jul. 17, 2012 (6 pages).
Final Office Action from the State Intellectual Property Office of China for Application No. 2006800545577 dated Dec. 19, 2012 (5 pages).
Office Action from the Canadian Intellectual Property Office for Application No. 2650516 dated Mar. 7, 2013 (4 pages).
Office Action from the Mexican Industrial Property Office for Application No. MX/a/2008/014201 dated Jul. 9, 2010 (3 pages).
Office Action from the Mexican Industrial Property Office for Application No. MX/a/2008/014201 dated Oct. 7, 2010 (2 pages).

* cited by examiner

CABLE TERMINATION FOR HIGH-VOLTAGE CABLE APPLICATION

BACKGROUND

The present invention relates to cable terminations for high-voltage applications. Cable terminations are available for indoor and outdoor applications. Cable terminations are manufactured of various, generally non-conductive materials, such as porcelain, polymer based materials, or both. The material used for manufacturing as well as the dimensions of the cable termination depend at least in part on desired characteristics of the cable termination and the voltage rating of the cable supported by the cable termination.

SUMMARY

In one embodiment, the invention provides a cable termination including a tubular body having an outer surface and a through aperture, and at least one shed extending from the outer surface. The shed includes an outer edge and a first support coupled to the shed. The first support extends between the outer surface of the tubular body and the outer edge of the shed, and is configured to increase the rigidity of the shed.

In another embodiment, the invention provides a cable termination including a tubular body with an outer surface and a through aperture, a first shed extending from the outer surface, and a second shed extending from the outer surface. The cable termination also includes a first support coupled to the first shed and extending from the outer surface, and a second support coupled to the second shed and extending from the outer surface. The first support is off-set from the second support by an angle between about 0 and 180 degrees with respect to a central axis extending through the tubular body.

In another embodiment, the invention provides a cable termination including a tubular body with a first end, a second end, and an outer surface. The cable termination also includes a first shed and a second shed integrally formed with the tubular body and extending from the outer surface, a first support integrally formed with the tubular body and the first shed, and a second support integrally formed with the tubular body and the second shed. The tubular body is formed with a non-conductive rubber material and defines a creepage distance between the first end and the second end along the outer surface of the tubular body and the first shed and the second shed.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 3:
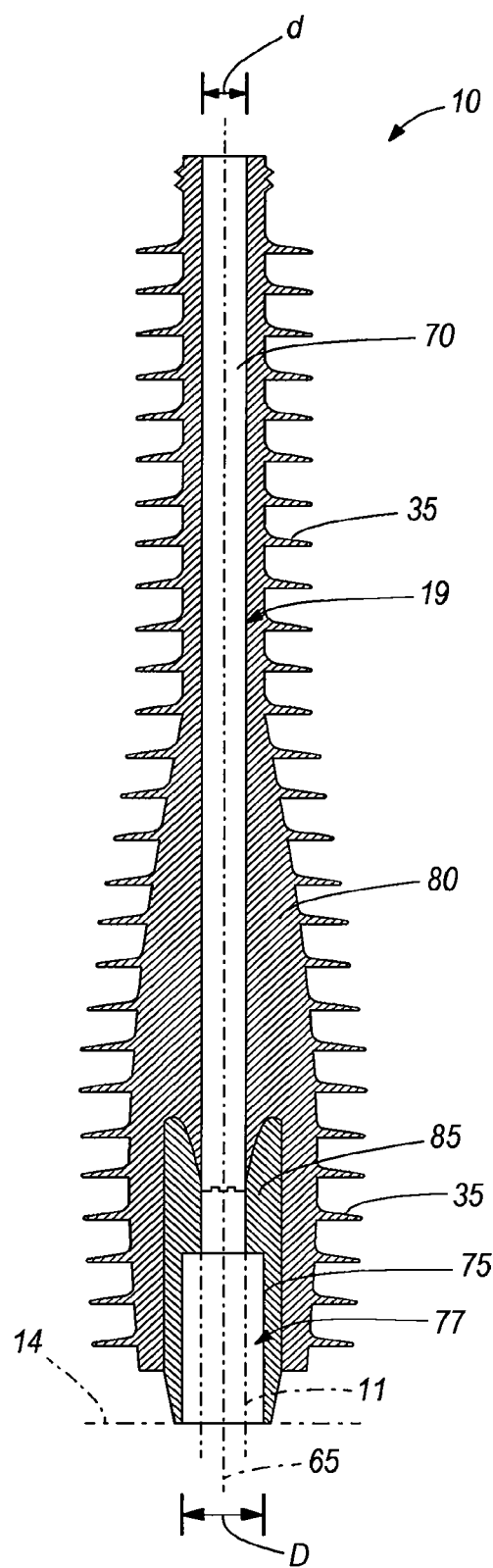
FIG. 3 is a cross-sectional view along line A-A in FIG. 2.

FIGS. 1 through 4 illustrate an exemplary cable termination 10 operable to support a high-voltage cable 11 therethrough and to connect the high-voltage cable 11 to ground 14 (schematically shown in FIG. 3). In the illustrated construction, the cable termination 10 is defined by a substantially elongated tubular body 12 extending along a center axis 65 (FIG. 3). The cable termination 10 includes a first end 17, and second end 22 and a through aperture 19 extending between the first end 17 and the second end 22. The cable termination 10 also includes a first portion 15 adjacent to the first end 17. The first end 17 has a first diameter. The cable termination also has a second portion 20 adjacent to the second end 22. The second end 22 has a second diameter. In the illustrated construction, the second diameter is greater than the first diameter. However, other constructions of the cable termination 10 can include a tubular body with a constant diameter or alternatively more than two portions with different diameters. The cable termination 10 also includes a number of sheds 35 extending from the tubular body 12, which are described in more detail below.

As indicated above, the cable termination 10 is operable to support a high-voltage cable 11 extending therethrough, where the second end 22 of the cable termination 10 is adjacent to the ground 14. Accordingly, the first end 17 of the cable termination 10 can be defined as the high-voltage end and a second end 22 can be defined as the ground or connecting end of the cable termination 10. Moreover, the longitudinal distance on the surface of the cable termination 10 and between the first end 17 and the second end 22 can be defined as the creepage distance. For the purposes of this application, "creepage" is defined as the electrical leakage on a solid dielectric surface (e.g., the surface of the cable termination 10). Accordingly, the "creepage distance" is the shortest distance on the dielectric surface between two conductive elements (e.g., high-voltage cable 11 and the ground 14), where current tracks or crawls across a generally non-conductive element between two conductive elements.

The dimensions of the cable termination 10 are at least in part based on the voltage rating of the cable extending through the cable termination 10 (e.g., cable 11 in FIG. 3). For example, the longitudinal distance between the first end 17 and the second end 22 can be calculated or determined based on the voltage rating of the cable supported by the cable termination 10. In one embodiment of the invention, the cable termination 10 is designed to support a cable with a voltage rating generally between 69 kV and 800 kV. For a voltage rating of 130 kV, the longitudinal distance between the first end 17 and the second end 22 of the cable termination is about 8 ft.

Figure 1:
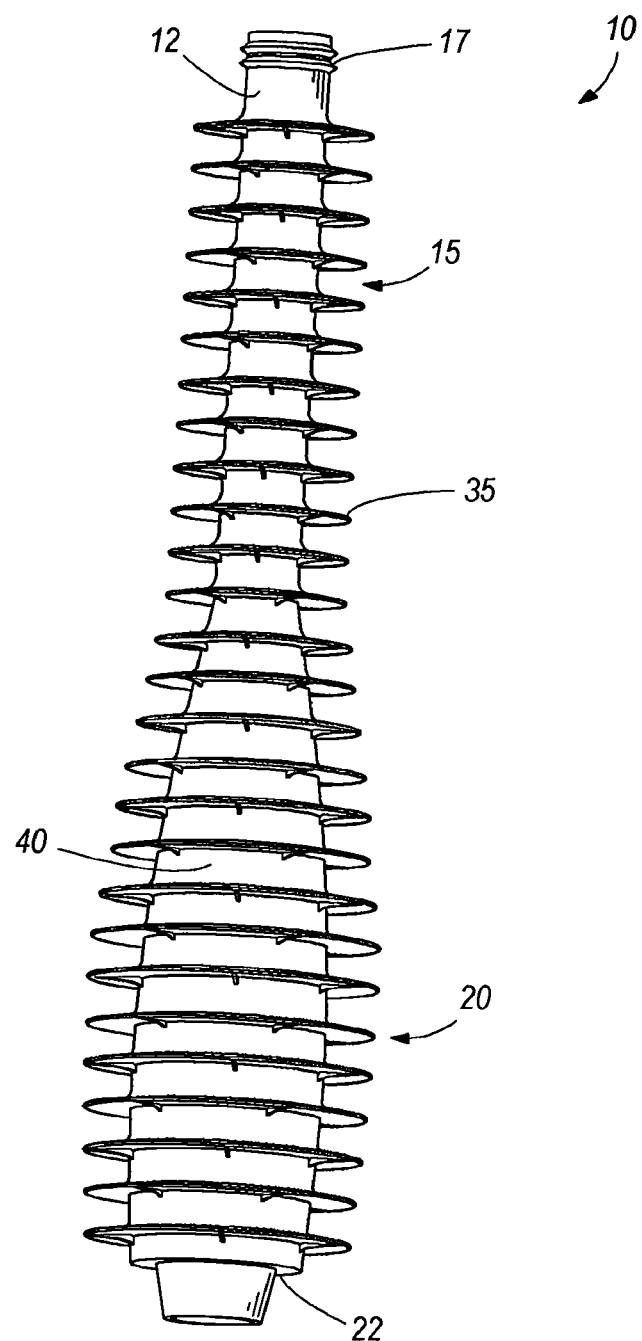
FIG. 1 is a cable termination according to one embodiment of the present invention.
Figure 2:
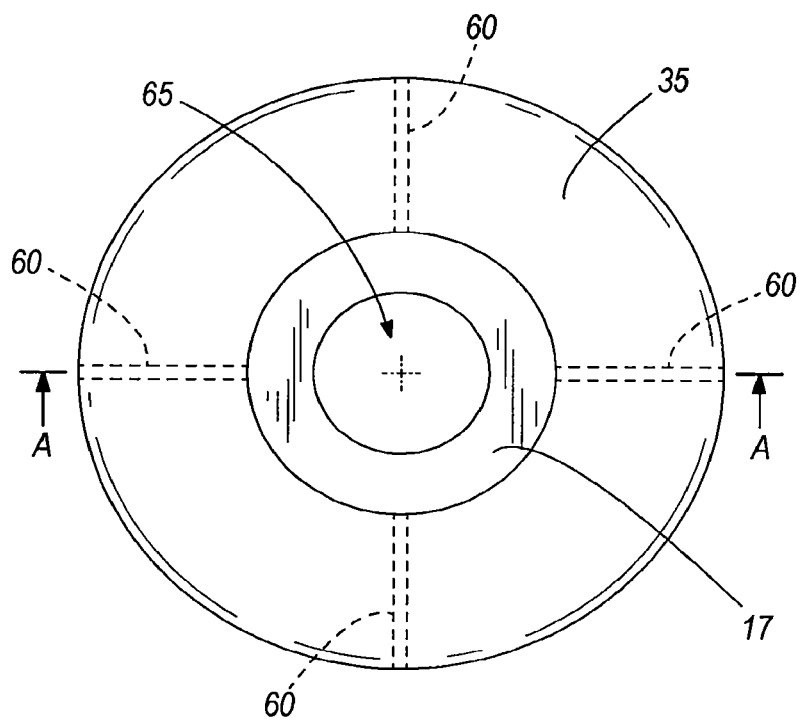
FIG. 2 is a top view of the cable termination.
Figure 4:
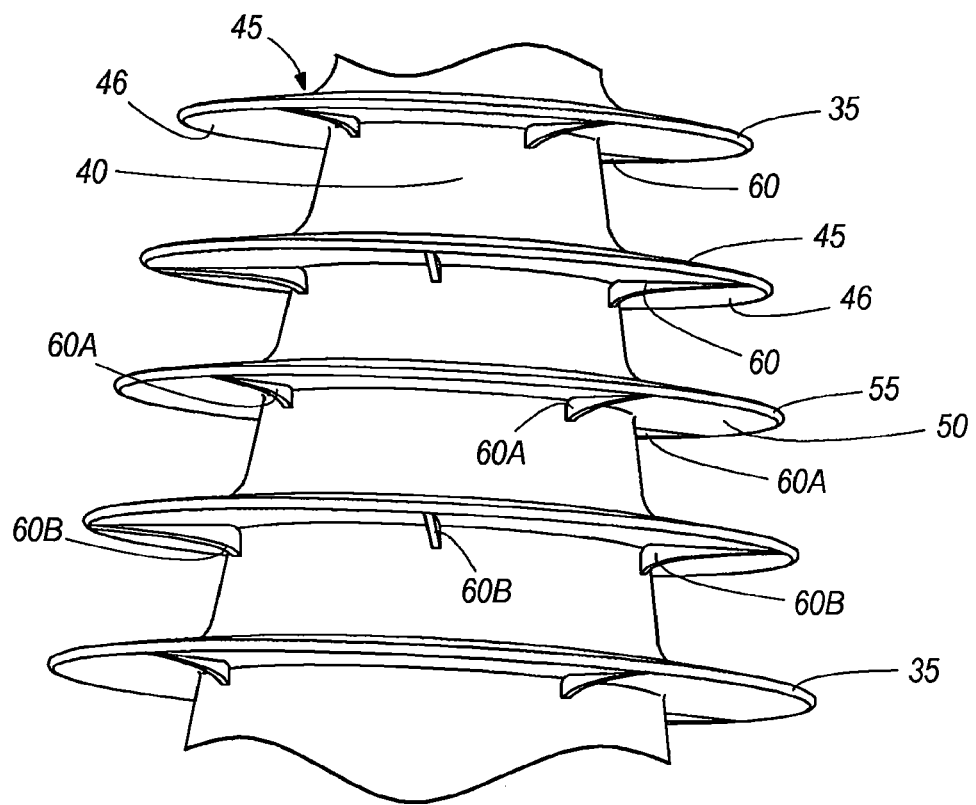
FIG. 4 is a detailed view of the cable termination illustrated in FIG. 1.

In the embodiments shown in FIGS. 1 and 4, a number of sheds 35 extend radially from an outer surface 40 of the tubular body 12. In the illustrated construction, the longitudinal distance between any two sheds 35 is substantially constant. Each shed 35 is defined by a substantially flat plate in a ring-like form including a top surface 45 and a bottom surface 46. The top and bottom surfaces 45, 46 of each shed 35 are defined between an inner edge 50 and an outer edge 55 of the ring-like plate. The diameter of the inner edge 50 is dependent on the portion of the cable termination 10 from which the shed 35 extends. For example, a shed 35 extending from the second portion 20 includes an inner edge 50 with a larger diameter than a shed 35 extending from the first portion 15. However, the radial distance between the inner edge 50 and the outer edge 55 is substantially equal for every shed 35 of the cable termination 10. In the illustrated construction, the inner edge 50 and the outer edge 55 define an annulus. However, the inner edge 50 and outer edge 55 can define different shapes in other constructions of the cable termination 10.

With reference to FIG. 4, the cable termination 10 also includes a set of four supports 60 integrally molded with each shed 35 (only three supports 60 for each shed 35 are shown in FIG. 4). Each support 60 includes a rib extending from the outer surface 40 of the cable termination 10 to the outer edge 55 of the shed 35. The four supports 60 corresponding to a shed 35 are separated from one another by a 90 degree angle. Additionally, the ribs of supports 60 coupled to one shed 35 (for example, supports 60A) are offset with respect to the ribs of supports 60 coupled to an immediately adjacent shed 35 (for example, supports 60B) by a 45 degree angle. The ribs of each support 60 are substantially perpendicular to a center axis 65 (shown in FIG. 3) of the cable termination 10. Other constructions of the cable termination 10 can include a different number of supports 60 coupled to each shed 35 as well as a different angular separation between each support 60. For example, two supports 60 can be separated by an angle between about 45 and about 180 degrees. The supports 60 can also include a shape different than the one illustrated in FIG. 4. Also, supports 60 of one shed 35 can be off-set with supports 60 of another shed 35 by an angle between about 0 and about 180 degrees.

With reference to FIG. 3, the through aperture 19 of the cable termination 10 includes a first part 70 aligned with the axis 65 and includes a first diameter d. The through aperture 19 also includes a second part 75 that is also aligned with the axis 65 and includes a second diameter D. In the illustrated construction, the diameter D of the second part 75 is greater than diameter d of the first part 70. When the cable termination 10 and the high-voltage cable 11 are assembled, the cable 11 snugly fits through the first part 70 of the through aperture 19. A space 77 is formed between the outer surface of the cable 11 and the inner surface of the second part 75 of the through aperture 19. In some constructions, the space 77 at least partially surrounds a connection or support element (not shown) of the high-voltage cable 11.

Still with reference to FIG. 3, the illustrated construction of the cable termination 10 includes a primary or main portion 80 and a secondary or inner portion 85 integrally formed with the primary portion 80 and adjacent to the second end 22 of the cable termination 10. The main portion 80 of the cable termination 10 is manufactured of a silicon rubber material and includes the sheds 35. The inner portion 85 of the cable termination 10 includes a molded rubber electrode. The molded rubber electrode of the inner portion 85 can be a silicon-based material with semiconductive properties. Other constructions of the cable termination 10 can include one or more portions of silicon rubber material with additives that provide the one or more portions with conductive properties based on desired parameters of the cable termination 10.

One advantage of manufacturing the cable termination 10 of a silicon rubber material is that the silicon rubber material provides the cable termination 10 with a self-cleaning feature. More specifically, the cable termination 10 can deform in a manner such that dirt, debris and other undesired elements are cleaned from the sheds 35 by natural agents (e.g., wind and rain). In addition, forming the sheds 35 with the silicon rubber material and providing the sheds 35 with the supports 60 allows the sheds 35 to deform such that the self-cleaning can occur but contact of the sheds 35 with one another is prevented or reduced.

Another advantage of manufacturing the cable termination 10 with silicon rubber material and forming supports 60 is that the supports 60 allow the use of less material in the manufacturing of the cable termination 10 which reduces costs. As a consequence, the cable termination 10 can include a relatively low number of sheds 35 and the sheds 35 can include a thinner annulus. The use of less silicon rubber material and the cable termination 10 including a lesser number of sheds 35 results in the cable termination 10 providing a longer creepage distance, thus improving the performance of the cable termination 10.

Various features and advantages of the invention are set forth in the following claims.

What is claimed is:

1. A cable termination comprising:
   a tubular body including an outer surface and a through aperture for receiving a cable therein; and
   at least one shed extending from the outer surface, the shed including an outer edge and plurality of supports including a first support and a second support coupled to the shed, the first and second supports each having a length extending from the outer surface of the tubular body substantially to the outer edge of the shed, the first and second supports each being in continuous contact with the shed along substantially the entire length of the respective support, and configured to increase the rigidity of the shed near the first and second supports,
   wherein each of the plurality of supports is separated from each of the other of the plurality of supports by at least 45 degrees, and
   wherein the at least one shed is operable to deform at locations away from the first and second supports.

2. The cable termination of claim 1, wherein the tubular body includes a first portion with a first diameter, and a second portion with a second diameter, the second diameter being greater than the first diameter.

3. The cable termination of claim 1, wherein the outer edge defines a substantially circumferential shape.

4. The cable termination of claim 1, wherein the shed includes an inner edge defined at the outer surface, the inner edge being concentric with the outer edge.

5. The cable termination of claim 1, wherein the first support comprises a rib extending from the outer surface.

6. The cable termination of claim 1, wherein the second support comprises a rib extending from the outer surface.

7. The cable termination of claim 1, wherein the first support is separated from the second support by an angle of about 90 degrees.

8. A cable termination comprising:
   a tubular body including an outer surface and a through aperture for receiving a cable therein, the through aperture extending through the tubular body in an axial direction;
   a plurality of sheds extending from the outer surface including
     a first shed extending from the outer surface; and
     a second shed extending from the outer surface;
   each shed having at least one support coupled thereto, wherein each support is aligned with a plane that extends in the axial direction, including
     a first support coupled to the first shed and extending from the outer surface; and
     a second support coupled to the second shed and extending from the outer surface,
   wherein the planes of the supports coupled to adjacent sheds are not aligned with one another along the axial direction, and
   wherein each shed is operable to deform at locations away from each of the at least one support.

9. The cable termination of claim 8, wherein the first support is off-set from the second support by an angle of at least 45 degrees.

10. The cable termination of claim 8, wherein the first shed includes a first outer edge, the second shed includes a second outer edge, and wherein first support extends substantially to the first outer edge and the second support extends substantially to the second outer edge.

11. The cable termination of claim 8, wherein at least one of the first support and the second support is defined by a rib-like formation.

12. The cable termination of claim 8, further comprising a third support coupled to the first shed and extending from the outer surface, the third support separated from the first support by an angle between about 45 degrees and about 180 degrees.

13. The cable termination of claim 12, wherein the first support is separated from the third support by an angle of about 90 degrees.

14. A cable termination comprising:
   a tubular body including a first end, a second end, an outer surface, and a through aperture, the through aperture extending through the tubular body in an axial direction;
   a plurality of sheds including a first shed adjacent to a second shed, both the first shed and the second shed being integrally formed with the tubular body and extending from the outer surface;
   each shed having a plurality of supports including
      a first plurality of supports coupled with the tubular body and the first shed; and
      a second plurality of supports coupled with the tubular body and the second shed,
   wherein each of the plurality of sheds includes a first side and a second side, the first sides of each of the plurality of sheds facing in the same direction, wherein all of the plurality of supports are coupled to the first side of each of the plurality of sheds and wherein the second sides of the sheds have no supports coupled thereto,
   wherein each support is aligned with a plane that extends in the axial direction, and
   wherein all of the planes of the first plurality of supports are off-set relative to all of the planes of the second plurality of supports along the axial direction.

15. The cable termination of claim 14, wherein the tubular body is formed with a non-conductive rubber material including a silicone based material.

16. The cable termination of claim 14, wherein the plurality of sheds are operable to deform to facilitate cleaning of debris between the first shed and the second shed.

17. The cable termination of claim 14, wherein at least one of the first plurality of supports and the second plurality of supports is defined by rib-like formations.

18. The cable termination of claim 14, wherein at least one of the first plurality of supports and second plurality of supports extends from the outer surface substantially to an outer edge of the corresponding first shed and second shed.

19. The cable termination of claim 14, wherein each of the first plurality of supports is off-set from each of the second plurality of supports by an angle between about 45 and about 90 degrees.

20. The cable termination of claim 19, wherein each of the first plurality of supports is off-set from each of the second plurality of supports by an angle of about 45 degrees.

21. The cable termination of claim 14, wherein the first shed is operable to deform and the first support helps avoid contact of the first shed and the second shed as a result of the first shed deforming.

* * * * *